United States Patent
Hirose et al.

[11] Patent Number: 5,818,496
[45] Date of Patent: Oct. 6, 1998

[54] EXPOSURE DEVICE OF ELECTROPHOTOGRAPHIC APPARATUS WITH OPTICAL PATH POSITION DECIDING DEVICE

[75] Inventors: Youji Hirose; Yasuyuki Tsuji; Shuuho Yokokawa; Kunitomo Takahashi; Isao Nakajima; Muneyoshi Akai; Satoshi Aita; Sho Sawahata; Shigeo Nemoto; Yukio Otome; Katsuhito Komoda; Keiji Kataoka; Kazuhiro Akatsu, all of Ibaraki, Japan

[73] Assignee: Hitachi Koki Co., Ltd., Tokyo, Japan

[21] Appl. No.: 502,056

[22] Filed: Jul. 14, 1995

[30] Foreign Application Priority Data

Jul. 14, 1994 [JP] Japan .................................. 6-162150

[51] Int. Cl.⁶ .............................. B41J 2/435; B41J 2/47
[52] U.S. Cl. .......................... 347/234; 347/242; 347/243
[58] Field of Search .................................. 347/241, 242, 347/243, 234, 235; 250/234–236, 206.1–206.2; 356/375

[56] References Cited

U.S. PATENT DOCUMENTS 5,225,924  7/1993  Ogawa et al. ..................... 347/243 X
5,434,600  7/1995  Schoon ............................... 347/243

FOREIGN PATENT DOCUMENTS

0323845A2  7/1989  European Pat. Off. .............. 347/241
6-31979(A)  2/1994  Japan .................................. 347/241

*Primary Examiner*—David F. Yockey
*Attorney, Agent, or Firm*—Sughrue, Mion, Zinn, Macpeak & Seas, PLLC

[57] ABSTRACT

An exposure device of an electrophotographic apparatus which includes a rotary polyhedral mirror for scanning a plurality of laser beams on a photosensitive body, a beam interval adjusting member for adjusting an interval between the laser beams, a rotating mechanism for rotating the beam interval adjusting member, and an optical path position deciding device disposed on the side of the rotary polyhedral mirror in a laser beam advancing direction at the time of adjustment of the laser beam interval, the beam interval adjusting member being rotated so that the optical paths of the laser beams are decided by the optical path position deciding device. The optical path position deciding device may include a plate-like member with boresights or a CCD sensor and a CRT display.

4 Claims, 3 Drawing Sheets

EXPOSURE DEVICE OF ELECTROPHOTOGRAPHIC APPARATUS WITH OPTICAL PATH POSITION DECIDING DEVICE

BACKGROUND OF THE INVENTION

1. Field of the Invention

The present invention relates to an exposure device of an electrophotographic apparatus.

2. Description of the Related Art

To carry out high speed and high definition printing by use of a single laser beam emitted from a single writing light source in the electrophotographic apparatus, (1) it is necessary to rotate a rotary mirror at a high speed, (2) it is necessary to shorten the driving time per dot, and so on. Accordingly, conventionally, the printing speed has had a limit to 15,000 lines per minute under the condition of resolution of 240 dot/inch (dpi).

In order to carry out printing with higher definition at a higher speed, therefore, a technique of carrying out printing by use of a plurality of laser beams is employed. Such a technique using a plurality of laser beams has advantages that (1) it is possible to make the rotational speed of the rotary mirror low, (2) it is possible to make the driving time per dot long, and so on, so that it becomes possible to expect high speed printing and high definition printing. An exposure device using a plurality of laser beams obtained by splitting a single laser beam emitted from a single light source is used to carry out exposure in an electrophotographic apparatus for high speed and high definition printing, because the adjustment of the laser beam passing position is easier than an exposure device using a plurality of light sources, and for other reasons.

Referring to FIG. 5, an example of a conventional exposure device using two laser beams will be described below. A single laser beam emitted from a single writing light source 1 is split into two laser beams by using a beam splitting member 2 such as diffraction grating. The thus split two laser beams are converged by a lens 3 and made incident into a multichannel modulation member 4. Each of the two laser beams incident into the modulation member 4 is modulated correspondingly to an image signal from a controller (not shown). The scanning directions of the two modulated laser beams are converged by means of a lens 5. The two laser beams with their scanning directions converged are adjusted so that a predetermined laser beam interval therebetween is obtained by rotating a beam interval adjusting member 6 such as a dove prism, and thereafter the directions of the two laser beams are changed by a reflection member 7. The two laser beams with their directions changed are made incident into a lens 8. The vertical scanning directions of the two laser beams are converged by means of the lens 8, and then the two laser beams are made, by a rotary polyhedral mirror 9 having, for example, 12 planes and a lens 10, to form an array of uniform spot shapes as a latent image on a photosensitive body 11. The latent image formed on the photosensitive body 11 is visualized with toner (not shown) made of particles of for example 10 μm, and then the toner image is transferred onto a printing sheet (not shown) by means of a transfer device (not shown) so that a picture is formed.

In the thus configured conventional technique, the laser beam interval adjustment has been carried out in such a manner that horizontal line printing is performed and the beam interval adjusting member 6 is rotated so that the beam interval becomes the predetermined value while measuring the horizontal line interval on a printed sample of the above-mentioned horizontal line printing by using a magnifying glass.

In the conventional exposure device, since the interval adjustment between two laser beams has been carried out in such a manner as mentioned above, it takes a long time for carrying out necessary beam interval adjustment and printing sheets are required for the beam interval adjustment, resulting in an increase in adjustment cost.

SUMMARY OF THE INVENTION

It is therefore an object of the present invention to provide an exposure device of the type in which a latent image is written on a photosensitive body by use of two laser beams, wherein the exposure device is low in cost and the laser beam interval adjustment can be carried out rapidly.

In order to attain the above object, according to an aspect of the present invention, there is provided an exposure device of an electrophotographic apparatus comprising; a rotary polyhedral mirror for making a plurality of laser beams to scan on a photosensitive body; a beam interval adjusting member for adjusting an interval between the laser beams; a rotating mechanism for rotating the beam interval adjusting member; and an optical path position deciding means disposed on this side of the rotary polyhedral mirror in a laser beam advancing direction at the time of adjustment of the laser beam interval, the beam interval adjusting member being rotated so that the optical paths of the laser beams are decided by the optical path position deciding means.

According to the above configuration, it is not necessary to carry out the horizontal line printing at the time of interval adjustment of a plurality of laser beams so that not only the adjustment can be carried out rapidly but also the printing sheets become unnecessary so that the cost can be reduced greatly.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

DETAILED DESCRIPTION OF THE PREFERRED EMBODIMENTS

Preferred embodiments of the present invention will be described below in reference to the accompanying drawings.

Figure 1:
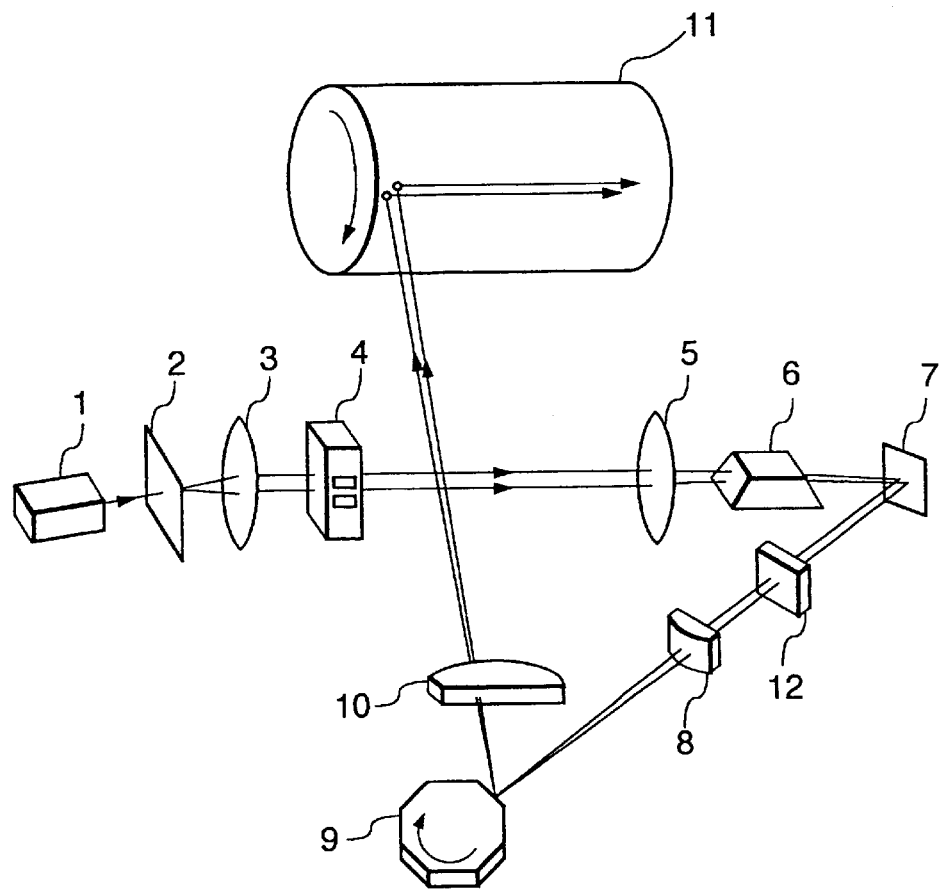
FIG. 1 is a configuration view showing an embodiment of the exposure device of an electrophotographic apparatus according to the present invention.

FIG. 1 is a configuration view showing an embodiment of the exposure device of an electrophotographic apparatus according to the present invention. The exposure device is constituted by: a laser light source 1 for emitting a laser beam; a beam splitting member 2 (for example, diffraction grating) for splitting the laser beam emitted from the laser light source 1 into a plurality of laser beams; a lens 3 for collimating the laser beams into collimated laser beams; a multichannel modulation member 4 for modulating each of the collimated laser beams; a lens 5 for converging the scanning directions of the modulated laser beams; a beam interval adjusting member 6 (for example, dove prism) for adjusting the interval between the laser beams; a rotating mechanism 15 (see FIG. 4) for rotating the beam interval adjusting member 6; a reflection member 7 for changing the direction of the laser beams; a lens 8 for converging the horizontal scanning directions of the laser beams; a rotary polyhedral mirror 9 for scanning the laser beams; and a lens 10 for focusing the laser beams onto a photosensitive body 11.

Figure 2A:
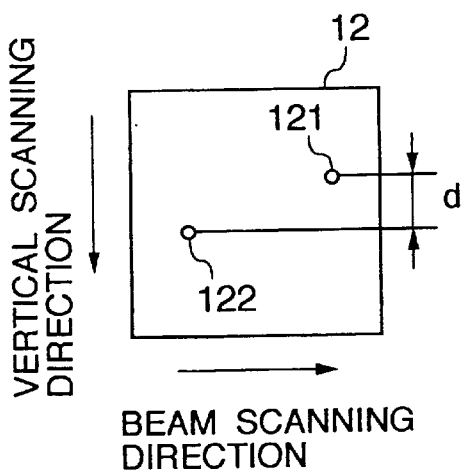
FIGS. 2A and 2B are enlarged views showing embodiments of the optical path position deciding member.
Figure 2B:
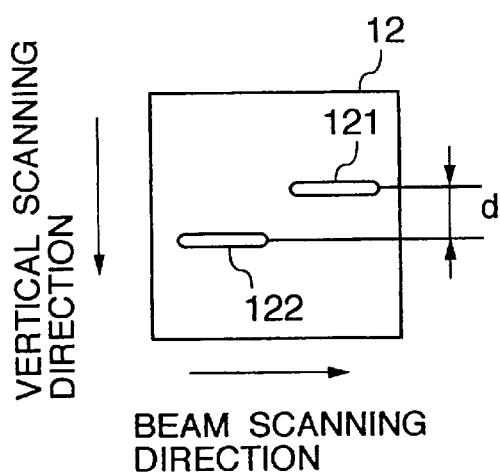

When the interval between the laser beams is to be adjusted, a plate-like optical path position deciding member 12 is disposed between the reflection member 7 and the lens 8. FIGS. 2A and 2B are enlarged views showing embodiments of the optical path position deciding member 12. Each of FIGS. 2A and 2B is a typical view in which the optical path position deciding member 12 is viewed from the reflection member 7 side. The optical path position deciding member 12 is made from a material such as sheet metal, plastics, or the like and is provided with a beam boresights 121 and 122 which become references for the respective optical paths of the laser beams. As the beam boresight, a transmission hole, a recess, a scar, a colored mark, or the like,can be used. The interval d between the beam boresights in the vertical scanning direction is set so that the interval between the laser beams becomes a predetermined value when the laser beams are focused on the photosentive body 11. FIG. 2A shows an example in which each of the beam boresights is made circular and FIG. 2B shows an example in which each of the beam boresights is made elliptic so as to absorb variations of the laser beam interval in the beam scanning direction.

The adjustment of the laser beam interval is carried out in a manner so that the beam interval adjusting member 6 is rotated by using the rotating mechanism 15 so as to make the two laser beams coincident with the beam boresights 121 and 122 formed in the optical path position deciding member 12. Thus, it becomes possible to carry out the laser beam interval adjustment without carrying out above-mentioned printing. After completion of the laser beam interval adjustment, the optical path position deciding member 12 is removed from the optical path.

Figure 3:
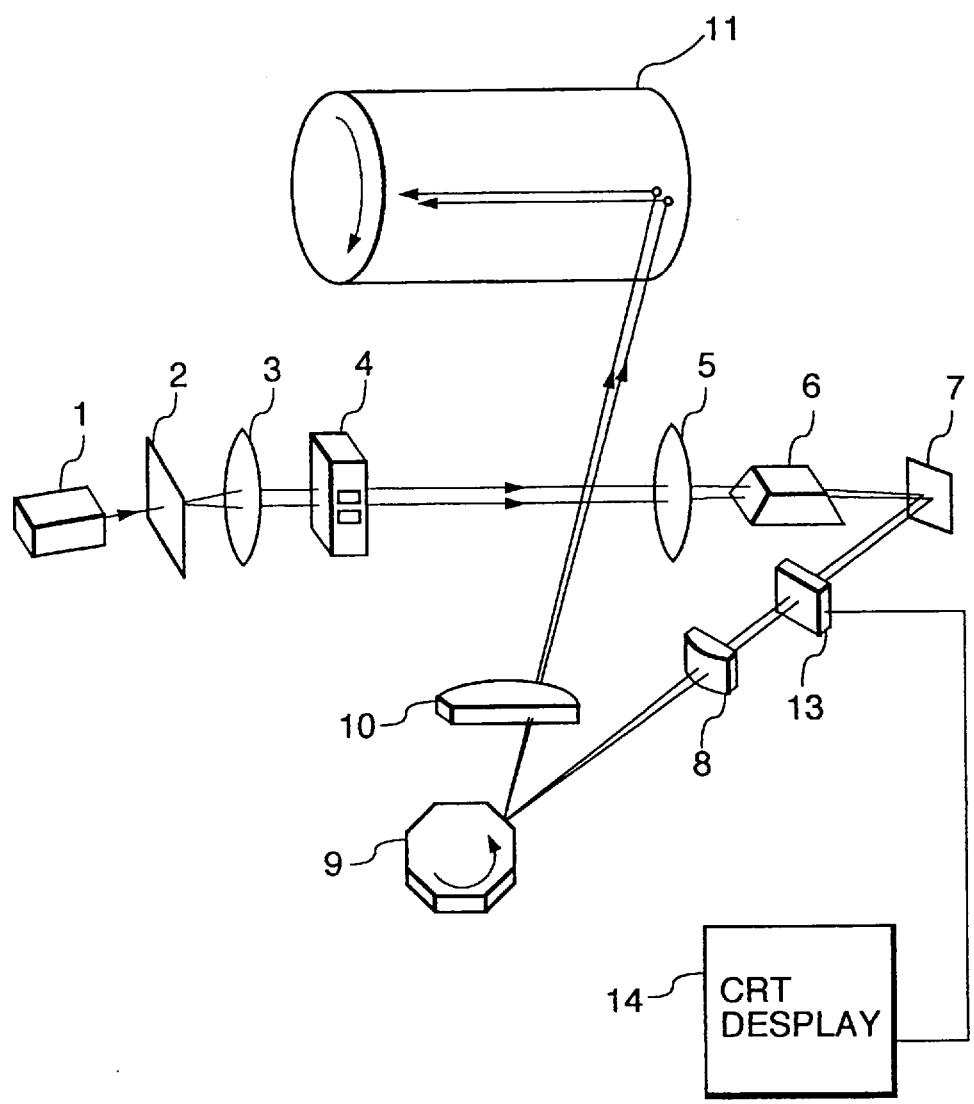
FIG. 3 is a configuration view showing another embodiment of the exposure device of an electrophotographic apparatus according to the present invention.

FIG. 3 is a configuration view showing another embodiment of the exposure device of an electrophotographic apparatus according to the present invention. In this embodiment, parts the same as those in first embodiment are referenced correspondingly and therefore the description will be omitted here. When the laser beam interval adjustment is carried out, a CCD sensor 13 is disposed between the reflection member 7 and the lens 8. The CCD sensor 13 is connected to a CRT display 14 provided with a size scale.

The laser beam interval adjustment is carried out in a manner so that image signals outputted from the CCD sensor 13 when the two laser beams are made incident into the CCD sensor 13 are visualized in the CRT display 14. That is, the beam interval is measured by use of the size scale on the picture screen of the CRT display 14 and the beam interval adjusting member 6 is rotated by use of the rotating mechanism 15 so that the beam interval becomes a predetermined value. In this manner, it becomes possible to carry out the adjustment of interval between two laser beams without carrying out printing. After completion of the laser beam interval adjustment, the CCD sensor 13 is removed from the optical path.

Figure 4:
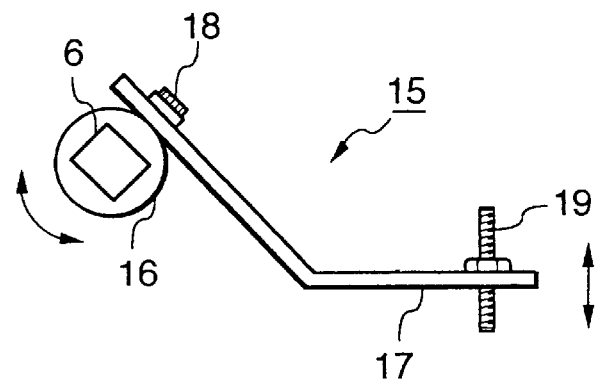
FIG. 4 is a configuration view showing an embodiment of a rotating mechanism of an beam interval adjusting member.
Figure 5:
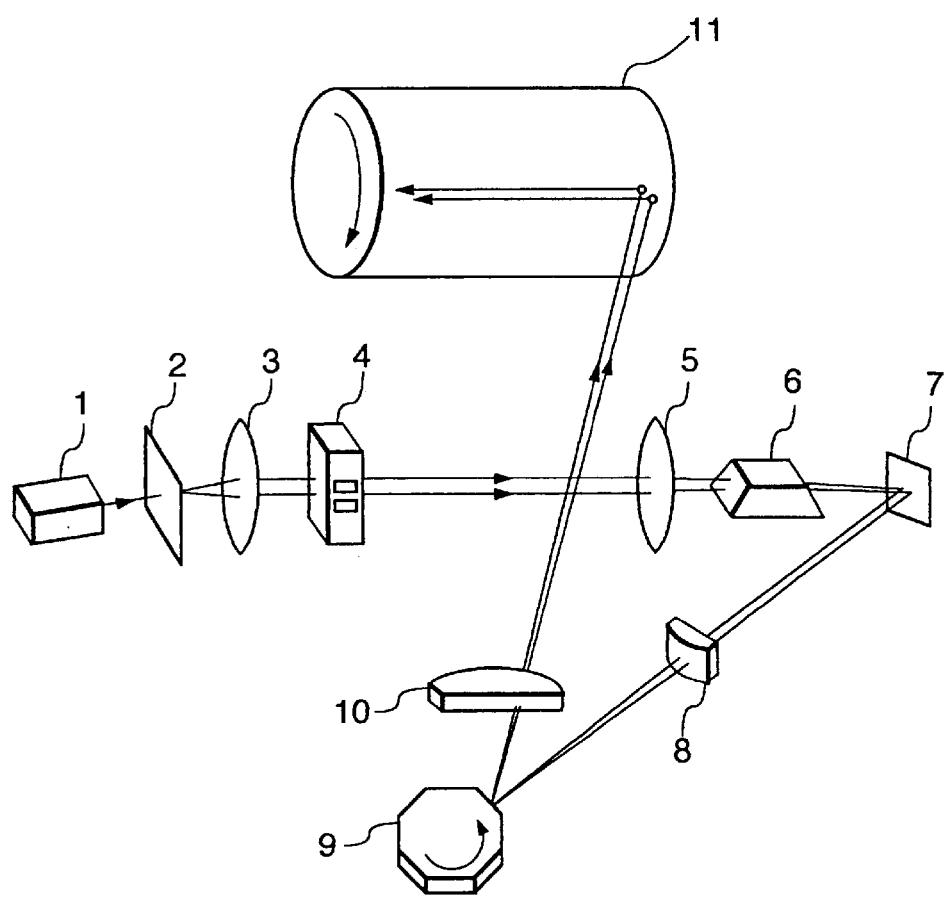
FIG. 5 is a configuration view showing an exposure device of an electrophotographic apparatus according to a conventional technique.

FIG. 4 is a configuration view showing an embodiment of the rotating mechanism 15 of the beam interval adjusting member 6. In FIG. 4, the reference numeral 6 designates a beam interval adjusting member; 16, a cylindrical holder for holding the beam interval adjusting member; 17, an arm fixedly attached on the holder 16 by means of a screw 18; and 19, a screw attached on an end portion of arm 17. When the screw 19 is rotated, the up/down motion of the arm 17 is converted into the rotary motion of the holder 16 so that the beam interval adjusting member 6 can be rotated.

Although each of the above embodiments shows the case where the optical path position deciding member 12/CCD sensor 13 is disposed between the reflection member 7 and the lens 8, the optical path position deciding member 12/CCD sensor 13 may be disposed in any position so long as the position comes between the beam interval adjusting member 6 and the rotary polyhedral mirror 9. Further, the present invention can be applied not only to the case of using two laser beams but also to the case of using three or more laser beams, In the case of using three or more laser beams, it is sufficient that the optical path position deciding member 12 is designed so as to be provided with boresights equal in number to the laser beams or provided with boresights for any two laser beams.

According to the present invention, an optical path position deciding means for deciding the optical path of the laser beams is disposed on this side of the rotary polyhedral mirror in a laser beam advancing direction at the time of adjustment of the laser beam interval. Accordingly, it is possible to obtain an exposure device of an electrophotographic apparatus in which the laser beam interval adjustment can be carried out rapidly and without using printing sheets and the cost of adjustment of the electrophotographic apparatus can be reduced.

While some specific embodiments have been described, it should be understood that the present invention is not limited to those embodiments, but may variously be modified, altered and changed within the scope of the present invention.

What is claimed is:

1. An exposure device for an electrophotographic apparatus, comprising:

a rotary polyhedral mirror positioned in a beam path towards a first end of said beam path so as to receive a plurality of laser beams which are transmitted over said beam path, said laser beams being directed such that said laser beams scan a photosensitive body when said rotary polyhedral mirror rotates about an axis thereof;

a rotatable beam interval adjusting member positioned in said beam path towards a second end of said beam path, said rotatable beam interval adjusting member comprising a prism;

a rotating mechanism connected to said rotatable beam interval adjusting member under manual adjustment of an operator;

an optical path position deciding device which decides whether said plurality of laser beams are spaced from each other by a predetermined interval, said optical path position deciding device being disposed in said beam path between said rotary polyhedral mirror and said rotatable beam interval adjusting member, said rotatable beam interval adjusting member being rotated by said rotating mechanism so that the interval between each of said laser beams is adjusted to become said predetermined interval in accordance with a decision of said optical path position deciding device.

2. An exposure device for an electrophotographic apparatus according to claim 1, further comprising:

single laser light source positioned at said second end of said beam path; and a beam splitting member disposed in said beam path between said single laser light source and said rotatable beam interval adjusting member, said beam splitting member splitting a laser beam emitted from said laser light source into said plurality of laser beams which from an array of light spots on said photosensitive body.

3. An exposure device for an electrophotographic apparatus according to claim 1, wherein:

said optical path position deciding device comprises a plate-like member having boresights provided thereon;

said boresights are set so that an interval between said boresights corresponds to said predetermined interval; and said rotatable beam interval adjusting member is rotated by said manual adjustment of said rotating mechanism attached thereto such that said laser beams are deviated and made to pass through said boresights when said laser beams are spaced from each other by said predetermined interval.

4. An exposure device for an electrophotographic apparatus according to claim 1, wherein:

said optical path position deciding device comprises a CCD sensor and a CRT display connected to said CCD sensor and provided with a size scale; and said rotatable beam interval adjusting member is rotated by said manual adjustment of said rotating mechanism attached thereto such that an interval between said laser beams in the vertical scanning direction becomes a predetermined value on said CRT display.

\* \* \* \* \*